(12) United States Patent
Vasudevan et al.

(10) Patent No.: US 11,368,310 B2
(45) Date of Patent: Jun. 21, 2022

(54) DATA TRANSFER BETWEEN COMPUTING NODES OF A DISTRIBUTED COMPUTING SYSTEM

(71) Applicant: Bank of America Corporation, Charlotte, NC (US)

(72) Inventors: Varshini Ramiya Vasudevan, Chennai (IN); Vinod Anbalagan, Kanchipuram District (IN); Madhav Vaidyanath, Chennai (IN); Thilagaraj Kannaiyan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 10 days.

(21) Appl. No.: 16/926,684

(22) Filed: Jul. 11, 2020

(65) Prior Publication Data

US 2022/0014377 A1 Jan. 13, 2022

(51) Int. Cl.
*G06F 15/16* (2006.01)
*H04L 9/32* (2006.01)
(Continued)

(52) U.S. Cl.
CPC ........ *H04L 9/3236* (2013.01); *H04L 61/2007* (2013.01); *H04L 65/1069* (2013.01);
(Continued)

(58) Field of Classification Search
CPC ............... H04L 9/3236; H04L 61/2007; H04L 65/1069; H04L 67/06; H04L 67/104; H04L 67/1095; H04L 61/609
(Continued)

(56) References Cited

U.S. PATENT DOCUMENTS 8,949,338 B2    2/2015   Ahmed et al.
9,569,771 B2    2/2017   Lesavich et al.
(Continued)

FOREIGN PATENT DOCUMENTS

EP    2280524 A2    2/2011
EP    3193299 A1    7/2017
(Continued)

OTHER PUBLICATIONS

L. C. Voicu, H. Schuldt, Y. Breitbart and H. Schek, "Flexible Data Access in a Cloud Based on Freshness Requirements," 2010 IEEE 3rd International Conference on Cloud Computing, 2010, pp. 180-187 (Year: 2010).*
(Continued)

*Primary Examiner* — Taylor A Elfervig

(57) ABSTRACT

A system and method are provided for a first computing node of a blockchain infrastructure to obtain at least one digital file from a second computing node of the blockchain infrastructure. The first computing node obtains a request for the at least one digital file. The first computing node identifies, based on a distributed ledger, the second computing node as a geographically closest computing node to the first computing node that has a copy of the at least one digital file stored locally at the second computing node. In response to the identifying, the first computing node establishes a peer-to-peer connection with the second computing node and receives a copy of the at least one digital file from the second computing node over the peer-to-peer connection.

20 Claims, 3 Drawing Sheets

(51) Int. Cl.

| | | |
|---|---|---|
| *H04L 67/104* | (2022.01) | |
| *H04L 61/5007* | (2022.01) | |
| *H04L 65/1069* | (2022.01) | |
| *H04L 67/06* | (2022.01) | |
| *H04L 67/1095* | (2022.01) | |
| *H04L 101/69* | (2022.01) | |

(52) U.S. Cl.
CPC ............ *H04L 67/06* (2013.01); *H04L 67/104* (2013.01); *H04L 67/1095* (2013.01); *H04L 61/609* (2013.01)

(58) Field of Classification Search
USPC .......................................................... 709/218
See application file for complete search history.

(56) References Cited

U.S. PATENT DOCUMENTS

| | | | |
|---|---|---|---|
| 9,608,829 | B2 | 3/2017 | Spanos et al. |
| 9,722,790 | B2 | 8/2017 | Ebrahimi |
| 2007/0211651 | A1 | 9/2007 | Ahmed et al. |
| 2009/0234918 | A1* | 9/2009 | Neumann ............... H04L 67/18 709/204 |
| 2009/0319502 | A1 | 12/2009 | Chalouhi et al. |
| 2015/0046337 | A1 | 2/2015 | Hu et al. |
| 2016/0080325 | A1 | 3/2016 | Hochberg et al. |
| 2016/0283920 | A1 | 9/2016 | Fisher et al. |
| 2016/0292672 | A1 | 10/2016 | Fay et al. |
| 2016/0330034 | A1 | 11/2016 | Back et al. |
| 2017/0041148 | A1 | 2/2017 | Pearce |
| 2017/0075941 | A1 | 3/2017 | Finlow-Bates |
| 2017/0085555 | A1 | 3/2017 | Bisikalo et al. |
| 2017/0126702 | A1 | 5/2017 | Krishnamurthy |
| 2017/0132625 | A1 | 5/2017 | Kennedy |
| 2017/0142076 | A1 | 5/2017 | Ford et al. |
| 2017/0185981 | A1 | 6/2017 | Emmerson |
| 2017/0206522 | A1 | 7/2017 | Schiatti et al. |
| 2017/0213209 | A1 | 7/2017 | Dillenberger |
| 2017/0220815 | A1 | 8/2017 | Ansari et al. |
| 2017/0221029 | A1 | 8/2017 | Lund et al. |
| 2017/0228371 | A1 | 8/2017 | Seger, II |
| 2017/0230189 | A1 | 8/2017 | Toll et al. |
| 2017/0237570 | A1 | 8/2017 | Vandervort |
| 2017/0244721 | A1 | 8/2017 | Kurian et al. |
| 2017/0279774 | A1 | 9/2017 | Booz et al. |
| 2017/0310747 | A1 | 10/2017 | Cohn et al. |
| 2017/0329980 | A1 | 11/2017 | Hu et al. |
| 2018/0287800 | A1 | 10/2018 | Chapman et al. |
| 2019/0205558 | A1* | 7/2019 | Gonzales, Jr. ........ G06Q 30/018 |
| 2019/0253252 | A1 | 8/2019 | Qiu |
| 2019/0320014 | A1* | 10/2019 | Allen .................... H04L 67/104 |
| 2020/0296152 | A1* | 9/2020 | Liu .......................... G06F 16/27 |
| 2020/0380097 | A1* | 12/2020 | Li ............................ G06F 21/16 |
| 2021/0141909 | A1* | 5/2021 | Zhai .................... G06F 16/1734 |

FOREIGN PATENT DOCUMENTS

| | | | |
|---|---|---|---|
| EP | 3257002 | A1 | 12/2017 |
| EP | 3257191 | A1 | 12/2017 |
| WO | 2015175722 | A1 | 11/2015 |
| WO | 2016170538 | A1 | 10/2016 |
| WO | 2017127564 | A1 | 7/2017 |
| WO | 2017145003 | A1 | 8/2017 |
| WO | 2017145007 | A1 | 8/2017 |
| WO | 2017145017 | A1 | 8/2017 |
| WO | 2017177260 | A1 | 10/2017 |
| WO | 2017195160 | A1 | 11/2017 |
| WO | 2017203093 | A1 | 11/2017 |
| WO | 2017218984 | A1 | 12/2017 |

OTHER PUBLICATIONS

M. Amoretti, G. Brambilla, F. Medioli and F. Zanichelli, "Blockchain-Based Proof of Location," 2018 IEEE International Conference on Software Quality, Reliability and Security Companion (QRS-C), 2018, pp. 146-153 (Year: 2018).*

Lv, Wenzhe, Sheng Wu, Chunxiao Jiang, Yuanhao Cui, Xuesong Qiu and Yan Zhang. "Decentralized Blockchain for Privacy-Preserving Large-Scale Contact Tracing." 2015: p. 1-16 (Year: 2015).*

Mao et al., . 2020. Perigee: Efficient Peer-to-Peer Network Design for Blockchains. In Proceedings of the 39th Symposium on Principles of Distributed Computing (PODC '20). Association for Computing Machinery, New York, NY, p. 428-437 (Year: 2020).*

Detho, Waqar. "Developing a system for securely time-stamping and visualizing the changes made to online news content." ArXiv abs/1802.07285 (2018): p. 1-117 (Year: 2018).*

F. R. Yu, J. Liu, Y. He, P. Si and Y. Zhang, "Virtualization for Distributed Ledger Technology (vDLT)," in IEEE Access, vol. 6, pp. 25019-25028, 2018, (Year: 2018).*

S. Park, S. Im, Y. Seol and J. Paek, "Nodes in the Bitcoin Network: Comparative Measurement Study and Survey," in IEEE Access, vol. 7, pp. 57009-57022, 2019 (Year: 2019).*

H. Khelifi et al., "Named Data Networking in Vehicular Ad Hoc Networks: State-of-the-Art and Challenges," in IEEE Communications Surveys & Tutorials, vol. 22, No. 1, pp. 320-351, Firstquarter 2020 (Year: 2020).*

L. Geiger, R. Schertle, F. Durr and K. Rothermel, "Temporal addressing for mobile context-aware communication," 2009 6th Annual International Mobile and Ubiquitous Systems: Networking & Services, MobiQuitous, 2009, pp. 1-10 (Year: 2009).*

J. Zhu, P. Liu and L. He, "Mining Information on Bitcoin Network Data," 2017 IEEE International Conference on Internet of Things (iThings) and IEEE Green Computing and Communications (GreenCom) and IEEE Cyber, Physical and Social Computing (CPSCom) and IEEE Smart Data (SmartData), 2017, pp. 999-1003 (Year: 2017).*

T. V. Doan, T. D. Pham, M. Oberprieler and V. Bajpai, "Measuring Decentralized Video Streaming: A Case Study of DTube," 2020 IFIP Networking Conference (Networking), 2020, pp. 118-126. (Year: 2020).*

L. Ismail, H. Materwala and S. Zeadally, "Lightweight Blockchain for Healthcare," in IEEE Access, vol. 7, pp. 149935-149951, 2019 (Year: 2019).*

* cited by examiner

DATA TRANSFER BETWEEN COMPUTING NODES OF A DISTRIBUTED COMPUTING SYSTEM

TECHNICAL FIELD

The present disclosure relates generally to data transfer between computing entities, and more specifically to data transfer between computing nodes of a distributed computing system.

BACKGROUND

Client-server architecture is one of the most widely adopted approach for designing, developing and rendering web-based applications. A popular implementation of the client-server architecture is the Content Delivery Network (CDN) which refers to a geographically distributed group of servers that work together to provide delivery of internet content. The CDN allows for the transfer of digital assets needed for loading internet content including Hypertext Markup Language (HTML) pages, javascript files, stylesheets, images and videos. A CDN works by caching static web assets on servers. When a web browser at a client device makes a request to visit a website, the required web assets are downloaded from a standalone (non-CDN) server or a CDN server hosting the web assets and a webpage is rendered based on the downloaded web assets. Examples of web assets that are needed to render a web page include Java Script (JS) files, Cascading Style Sheet (CSS) files, images and the like. CDN servers are generally distributed globally and digital assets are typically delivered to a client device from a CDN server closest to the client device.

Rendering a web page at the shortest load time irrespective of the richness of the underlying web assets needed to render the webpage is important and has a direct impact on the user experience. However, with users accessing web applications across the internet from different geographical locations and with different internet bandwidths, relying on a centralized server for caching and delivery of the web assets is not always ideal. For example, when a standalone server is used to host web applications and store web assets required to render web pages, a large server space is generally required resulting in significant system costs. Additionally, download times may significantly vary depending on the relative geographical locations of the standalone server and client devices as the download time is a function of how far the data needs to travel. Using a CDN having servers distributed globally may help improve the download speeds. However, CDNs generally suffer from an even higher cost burden as server space on several CDN servers must be bought from external CDN vendors. As a result, CDN networks tend to be a better option only for large companies who can afford such costs. Download times from a server are also a function of server traffic. For example, many client nodes simultaneously attempting to download web assets from the same server may result in higher server download times. Also, the content hosted on a centralized server may not be very secure. For example, owing to the centralized nature of the servers in a client-server system, the servers are more prone to being manipulated by a rogue administrator or third-party hacks.

SUMMARY

The system and methods implemented by the system as disclosed in the present disclosure provide technical solutions to the technical problems discussed above by leveraging a blockchain infrastructure for exchanging digital files such as web assets between neighboring nodes instead of the nodes downloading the digital files from a centralized server. The disclosed system and methods provide several practical applications and technical advantages. Each time a node of the blockchain infrastructure transmits or receives a digital file, a new block of the blockchain is created that records the transaction. A hash is generated for each new block based on a cryptographic hash algorithm, wherein the hash uniquely identifies the new block and the transaction recorded by the new block. Each block of the blockchain includes a hash of the block, a hash of the previous block, data relating to the transaction associated with the block and a timestamp of the transaction.

A distributed ledger of the blockchain infrastructure maintains information relating to the Internet Protocol (IP) address of each node of the blockchain infrastructure, a geographical region within which each node is located, information relating to one or more geographically closest nodes for each node, digital files locally stored at each node, and a copy of the blockchain including hashes of each block of the block chain and transaction data associated with each block. When a first node receives a request for obtaining a digital file, the first node obtains from the distributed ledger information relating to a geographically closest second node that has a copy of the digital file. The first node then establishes a peer-to-peer connection with the second node and receives the copy of the digital file from the second node.

By allowing the nodes of the blockchain infrastructure to exchange digital files between the nodes, the system and methods disclosed herein reduce, and in some cases eliminate, the need for the nodes to download the digital files from a centralized server. This may reduce or avoid the cost burden associated with maintaining server space. Additionally, this may also help with achieving consistently higher download speeds as server congestion may not be an issue. Furthermore, blockchain supports immutability which means that data once written cannot be erased or replaced. The immutability of the blockchain significantly reduces the chances of data tampering within the network and makes the system significantly secure as compared to a system based on traditional client-server architecture.

Certain aspects of the present disclosure may include some, all, or none of these advantages. These advantages and other features will be more clearly understood from the following detailed description taken in conjunction with the accompanying drawings and claims.

In certain aspects, a system includes a first computing node and a second computing node of a plurality of computing nodes of a blockchain infrastructure, wherein each of the plurality of computing nodes, including the first and the second computing nodes, stores a copy of a distributed ledger. The distributed ledger generally includes at least one of information related to a location of each of the plurality of computing nodes, information relating to one or more neighboring computing nodes of each of the plurality of computing nodes, information relating to one or more digital files stored locally at each of the plurality of computing nodes, and information relating to hash mappings of blocks of a blockchain associated with the blockchain computer infrastructure. The first computing node includes a first memory device that stores a first copy of the distributed ledger and at least one digital file downloaded by the first computing device. The second computing node includes a second memory device that stores a second copy of the distributed ledger. The second computer node further includes a processor operably coupled to the second memory device. The processor is generally configured to obtain a request for the at least one digital file and identify, based on the distributed ledger, the first computing as a geographically closest computing node to the second computing node of the plurality of computing nodes that has a copy of the at least one digital file. The second computing node establishes a peer-to-peer connection with the first computing node and receives the copy of the at least one digital file from the first computing node over the peer-to-peer connection.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

System Overview

Figure 1:
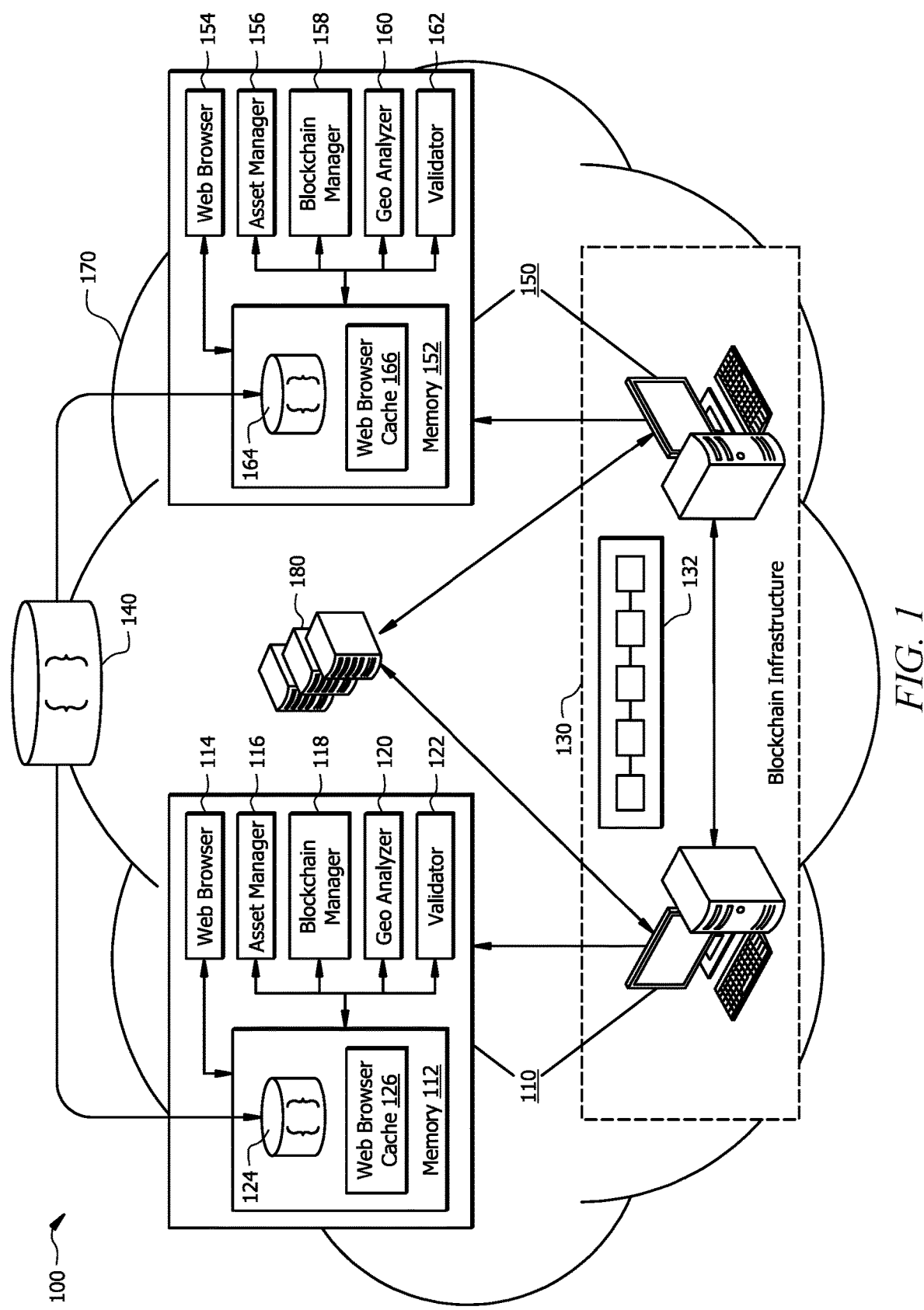
FIG. 1 is a schematic diagram of a system that leverages a blockchain infrastructure for exchanging digital files between computing nodes, in accordance with certain aspects of the present disclosure.

FIG. 1 is a schematic diagram of a system 100 that leverages a blockchain infrastructure for exchanging digital files between computing nodes, in accordance with certain aspects of the present disclosure. While certain aspects of the following disclosure describe the various components of the system 100 and their respective functions in the context of exchanging web assets used for rendering web pages, it may be appreciated by a person of ordinary skill in the art that the disclosed aspects equally apply to exchanging other types of digital data.

As shown, system 100 includes a first computing node 110, a second computing node 150 and one or more servers 180 connected to a network 170. As shown, the first computing node 110 further includes a memory device 112 operatively coupled with a web browser application 114, an asset manager 116, a blockchain manager 118, a geo-analyzer 120 and a validator 122. The second computing node 150 is substantially identical to the first computing node 110. Like the first computing node 110, the second computing node 150 includes a memory device 152 operatively coupled to a web browser application 154, an asset manager 156, a blockchain manager 158, a geo-analyzer 160 and a validator 162. In an aspect, one or more of the servers 180 may be stand-alone web servers or CDN servers hosing web content.

In certain aspects, each of the first computing node 110 and the second computing node 150 may include a computing device running one or more software applications. For example, each of the first computing node 110 and the second computing node 150 may be representative of a computing system hosting software applications that may be installed and run locally or may be used to access software applications running on a server (e.g., one or more of the servers 180). The computing system may include mobile computing systems including smart phones, tablet computers, laptop computers, or any other mobile computing devices or systems capable of running software applications and communicating with other devices. The computing system may also include non-mobile computing devices such as desktop computers or other non-mobile computing devices capable of running software applications and communicating with other devices.

In one embodiment, the web browser 114, asset manager 116, blockchain manager 118, geo-analyzer 120 and validator 112 may be software applications implemented by at least one processor executing software instructions stored in the memory device 112. Similarly, the web browser 154, asset manager 156, blockchain manager 158, geo-analyzer 160 and validator 162 may be software applications implemented by at least one processor executing software instructions stored in the memory device 152.

The network 170, in general, may be a wide area network (WAN), personal area network (PAN), a cellular network, or any other technology that allows devices to communicate electronically with other devices. In one or more aspects, the network 170 may be the internet.

Blockchain Infrastructure

The first computing node 110 and the second computing node 150 may be part of a blockchain infrastructure 130 which includes a plurality of computing nodes (including the first and second computing nodes 110 and 150) connected to the network 170. The blockchain infrastructure 130 implements a blockchain 132 across the plurality of the computing nodes. In an aspect, each of the plurality of computing nodes of the blockchain infrastructure 130 includes components similar to the components of the first computing node 110 and the second computing node 150 as shown in FIG. 1.

A blockchain (e.g., blockchain 132) generally is an open, decentralized and distributed digital ledger (e.g., blockchain ledger 140) consisting of records called blocks that are used to record transactions across many nodes (e.g., computing nodes 110 and 150). Each node of a blockchain network (e.g., blockchain infrastructure 130) may maintain a copy of the blockchain ledger 140. Logically, a blockchain 132 is a chain of blocks which contains specific information. Once recorded, the data in any given block cannot be altered retroactively without alteration of all subsequent blocks, which requires consensus of the network majority. Each node within the network maintains, approves, and updates new entries. The system is controlled not only by separate individuals, but by everyone within the blockchain network. Each member ensures that all records and procedures are in order, which results in data validity and security. Thus, the distributed ledger 140 can record transactions between two parties efficiently and in a verifiable and permanent way. By design, a blockchain is resistant to modification of the data. For use as a distributed ledger, a blockchain is typically managed by a peer-to-peer network collectively adhering to a protocol for inter-node communication and validating new blocks. In an aspect, the blockchain ledger 140 persists information including identities (e.g., IP addresses) of each active node of the blockchain infrastructure, a geographical region within which each node is located, information regarding geographically closest nodes for each node, digital files locally stored at each node, and a copy of the blockchain 132.

As shown in FIG. 1, both the first computing node 110 and the second computing node 150 store a copy of the blockchain ledger 140 (shown as ledgers 124 and 164) of the blockchain infrastructure 130 in their respective memory devices 112 and 152. Each of the ledgers 124 and 164 persists a copy of the blockchain 132 associated with the blockchain infrastructure 130.

Blockchain Managers

Each of the blockchain managers 118 and 158 is configured to process new blocks generated for the blockchain 132 and maintain a most recent copy of the blockchain 132 in the respective ledgers 124 and 164. Any new transaction within the blockchain infrastructure 130 triggers the building of a new block of the blockchain 132. A transaction may include a node of the blockchain infrastructure 130 transmitting or receiving data from another node or from one of the servers 180. For example, either one of the first computing node 110 and the second computing node 150 transmitting or receiving data may trigger the respective blockchain manager 118 or 158 to build a new block of the blockchain 132. Before a new block is added to the blockchain 132, it needs to be verified by a majority of the nodes in the blockchain infrastructure 130. For example, once a new block is created at a computing node (e.g., computing node 110 or computing node 150), it is sent to each other computing node of the blockchain infrastructure 130. Each other computing node verifies the new block and checks whether the information stated in the new block is correct. Once approved by a majority of the computing nodes, the new block is added to the blockchain 132. For example, each of the blockchain managers 118 and 158 may be configured to generate a new block and send the new block out to each other computing node of the blockchain infrastructure 130 for validation and approval. Additionally, the blockchain managers 118 and 158 may be configured to receive requests from other computing nodes for addition of new blocks and may validate new blocks for addition to the blockchain 132. Once a new block is approved for addition to the blockchain 132, each of the blockchain managers 118 and 158 may be configured to update a local copy of the blockchain 132 persisted in the respective ledger 124 or 164 to reflect the addition of the new block.

Each block of the blockchain 132 includes a hash of the block, a hash of the previous block, data that records one or more transactions associated with the block, and a timestamp of the one or more transactions recorded by the block. The data stored in each block depends on the type of blockchain. For example, the data included in each block may include information relating to the transaction recorded by the block including transmitting/receiving data, details of the data files, identities of the sending and receiving nodes involved in the transaction etc. A hash of a block is like a fingerprint that uniquely identifies the block (and the transaction recorded by the block) within the blockchain 132. Each hash of a block is generated based on a cryptographic hash algorithm.

Each of the web browsers 114 and 154 is configured to access information on the world wide web (e.g., the Internet). For example, when a user operating the first computing node 110 requests a web page from a website, the web browser 114 retrieves the necessary web assets from a web server 180 and renders the web page based on the retrieved web assets for display on a display screen of the first computing node 110. Examples of web assets that are needed to render a web page include Java Script (JS) files, Cascading Style Sheet (CSS) files, images and the like. The downloading of the digital files for rendering the web page triggers the blockchain manager 118 to generate a new block of the blockchain 132 in order to record the downloading as a new transaction. The blockchain manager 118 generates a unique hash for the new block and adds the generated hash to the block. Additionally, the blockchain manager 118 adds a hash of the previous block and data relating to the new transaction to the new block. The data relating to the new transaction as added to the new block may include identities (e.g., IP addresses) of the first computing node 110 and the web server 180 used to download the digital files and information identifying the downloaded digital files. The blockchain manager 118 may also add a timestamp of the download transaction to the new block that identifies a time at which the download transaction took place. Once the new block is verified by other computing nodes of the blockchain infrastructure 130 as described above, the blockchain manager 118 adds the new block to the blockchain 132 and updates the copy of blockchain 132 stored in the ledger 124 to reflect the new block. Additionally, each other computing node of the blockchain infrastructure 130 updates its copy of the blockchain 132 locally stored in their respective memory devices. For example, the blockchain manager 158 updates the copy of the blockchain 132 persisted in the ledger 164 of the second computing node 150 to add the new block. Furthermore, the first computing node 110 stores the digital files downloaded form the web server 180 in a local cache 126 (e.g., a web browser cache assigned for the web browser 114). As shown, the cache 126 may be stored in the memory device 112.

In an aspect, when a new computing node is added to the blockchain infrastructure 130, the new computing node receives a copy of the blockchain ledger 140 from one of the other computing nodes of the blockchain infrastructure 130. The blockchain manager of the new computing node stores the received copy of the blockchain ledger 140 to a local memory device. The blockchain manager of the new computing node further stores information relating to the new computing node to its copy of the blockchain ledger 140 and also sends out the information for storing in the copies of the ledger 140 at other computing nodes. The information relating to the new computing node may include an IP address of the new computing node and any digital files stored in the local cache of the new computing node. For example, when the first computing node 110 connects as a new node to the blockchain infrastructure 130, the blockchain manager 118 receives a copy of the blockchain ledger 140 which it stores as ledger 124 in the memory device 112. The blockchain manager 118 further stores to the ledger 124 an IP address of the first computing node 110 and digital files stored in the cache 126. The blockchain manager 118 also sends out this information to other nodes of the blockchain infrastructure 130. For example, the blockchain manager 158 receives the information and stores the same in the ledger 164. In one aspect, the blockchain manager 118 generates a new block of the blockchain 132 upon addition of the first computing node 110 to the blockchain infrastructure 130. The new block may be added to the blockchain 132 as described above.

Geo-Analyzers

Each of the geo-analyzers 120 and 160 is configured to detect one or more computing nodes of the blockchain infrastructure 130 that are geographically closest to the first computing node 110 and the second computing node 150 respectively. In an aspect, a computing node is determined as geographically closest to another computing node if the computing node is in the same geographical region as the other computing node. Each geo-analyzer (120 and 160) is configured to detect an IP address of the respective computing node (110 and 150) and determine a geographical region within which the computing node is located. Once, a geographical region of the computing node is identified, the geo-analyzer identifies other computing nodes that are in the same geographical region and designates the identified other computing nodes as closest computing nodes. For example, the geo-analyzer 120 may detect the IP address of the first computing node 110 and may determine a geographical region within which the first computing node 110 is located. The geo-analyzer 120 may upload the determined geographical region information of the first computing node 110 to the ledger 124 and also send out the information to other computing nodes for storing in their respective copies of the blockchain ledger 140. Once, the geographical region of the first computing node 110 is identified, the geo-analyzer 120 identifies other computing nodes that are in the same geographical region and designates the identified other computing nodes as geographically closest computing nodes of the first computing node 110. The geo-analyzer 120 may upload the information relating to the geographically closest computing nodes of the first computing node 110 to the ledger 124 and also send out the information to other computing nodes for storing in their respective copies of the blockchain ledger 140. In an aspect, the geo-analyzer (120 and 160) uses the WebRTC (Web Real-Time Communication) protocol to detect the IP address of a computing node and uses the GeoIP database to determine a geographical region of the computing node based on the identified IP address of the computing node. In order to determine the geographically closest computing nodes, the geo-analyzer may use WebRTC to identify IP addresses of each other computing node and then use the GeoIP database to determine geographical regions for each other computing node. Once the geographical regions of all computing nodes are identified, the geo-analyzer may determine computing nodes that are located in the same geographical regions. Alternatively, since the blockchain ledger 140 stores information relating to the geographical regions of each computing node, the geo-analyzer of a computing node may determine computing nodes located in the same geographical regions based on the information stored in the blockchain ledger.

Asset Managers

Each of the asset managers 116 and 156 is configured to retrieve, from other nearby computing nodes, web assets required to render web pages at the respective first computing node 110 and the second computing node 150. For example, when the second computing node 150 receives a request for a web page, the second computing node 150 attempts to identify a geographically closest computing node of the blockchain infrastructure 130 that has a copy of one or more digital files needed to render the requested web page. The one or more digital files may include one or more web assets needed to render the requested web page. Examples of web assets that may be needed to render the web page include Java Script (JS) files, Cascading Style Sheet (CSS) files, images and the like. A computing node may be determined as geographically closest to the second computing node 150 when the computing node is within the same geographical region as the second computing node 150. In an aspect, a user of the second computing node 150 may request for the web page using the web browser 154, for example, by selecting a web link on another web page displayed by the web browser 154 on a display output.

Upon receiving the request for the web page at the second computing node 150, the asset manager 156 may call the ledger 164 to obtain information relating to a geographically closest computing node that has a copy of the one or more digital files needed to render the requested web page. As described above, the ledger 164 may store information relating to the geographically closest computing nodes for each computing node of the blockchain infrastructure 130, and further store information relating to the digital files locally stored at each computing node. For example, the ledger 164 may have information relating to multiple computing nodes that are in the same geographical region as the second computing node 150, and thus, are considered as geographically closest computing nodes to the second computing node 150. Further, more than one of these geographically closest computing nodes may store a local copy of the one or more digital files required by the second computing node 150. In such a case, the asset manager 158 may select one of the geographically closest computing nodes that has the most recent copy of the one or more digital files. In an aspect, the asset manager 158 may identify a most recent copy of the one or more digital files by comparing the timestamps of the blocks that recorded the downloading/receiving of the digital files at each of the geographically closest computing nodes having a copy of the one or more digital files. As described above, a new block is created and added to the blockchain 132 each time a computing node receives a digital file and a timestamp of the transaction is added to the new block. The asset manager 158 may identify the geographically closest computing node having the most recent copy of the digital file by identifying a closest computing node that generated a block for the download of the digital file with the most recent time stamp.

Once the asset manager 156 obtains information relating to the geographically closest computing node that has a most recent copy of the one or more digital files, the asset manager 156 may establish a peer-to-peer connection with the closest computing node and receive the one or more digital files from the closest computing node. For example, the first computing node 110 may be in the same geographical region as the second computing node 150 and may have the most recent copy of the one or more digital files stored in its cache 126. In this case, the asset manager 156 of the second computing node 150 calls the ledger 164 and identifies the first computing node 110 as the geographically closest computing node having the most recent copy of the one or more digital files. The asset manager 156 obtains information from the ledger 164 relating to the first computing node 110 and information relating to the copy of the one or more digital files stored in the cache 126 of the first computing node. This information may include the IP address of the first computing node 110 and a hash of the block of the blockchain 132 that uniquely identifies the downloading of the one or more digital files by the first computing node 110. The asset manager 156 may establish a peer-to-peer connection between the second computing node 150 and the first computing node 110 based on the IP address of the first computing node 110. For example, the WebRTC protocol may be used to establish the peer-to-peer connection between the first computing node 110 and the second computing node 150. The asset manager 156 may request the first computing node 110 for the copy of the one or more digital files stored in the cache 126 by transmitting the unique hash obtained from the ledger 164 over the peer-to-peer connection. The asset manager 116 of the first computing node 110 may identify the copy of the one or more digital files stored in cache 126 based on the hash and transmit the copy to the second computing node 150 over the peer-to-peer connection. IPFS protocol may be used for exchanging data between the first computing node 110 and the second computing node 150 over the WebRTC based peer-to-peer connection. For example, the second computing node 150 may transmit the unique hash identifying the copy of the one or more digital files stored in the cache 126 using the IPFS protocol. Further, the second computing node 150 may receive the copy of the one or more digital files from the first computing node using the IPFS protocol. Upon receiving the copy of the one or more digital files from the first computing node 110, the web browser 154 of the second computing node 150 may render the requested web page based on the web assets included in the one or more digital files. Further, the asset manager 156 may generate a new block to record the transaction of receiving the copy of the one or more digital files from the first computing node 110 and store the copy in the cache 166. The ledger 164 is updated to add the new block and information relating to the one or more digital files stored in the cache 166. The same information is also sent out to each other computing node of the blockchain infrastructure 130 for updating their respective copies of the blockchain ledger 140.

Validators

Each of the validators 122 and 162 of the respective computing nodes 110 and 150 are configured to validate the integrity of connections established with other computing nodes and the integrity of the data files received from the other computing nodes. For example, before sending out a request to the first computing node 110 for the copy of the one or more digital files stored in its cache 126, the validator 162 of the second computing node validates whether the first computing node 110 is actively connected to the blockchain infrastructure 130, validates whether a reliable peer-to-peer connection can be established between the first and second computing nodes, and further validates whether the hash obtained from the ledger 164 points to the correct digital files needed for rendering the requested web page. The validator 162 may further validate the copy of the one or more digital files received from the first computing node 110 in order to ensure that the correct digital files needed for rendering the requested web page are received.

In certain aspects, each node of the blockchain infrastructure 130 may download files from a server 180 as a fallback option. For example, if the second computing node 150 is unable to receive the required one or more digital files from another computing node of the blockchain infrastructure 130, the second computing node 150 may download the digital files from a server 180 (e.g., a stand-alone web server or a CDN server). One or more of several factors may trigger the second computing node to download the digital files from a server 180. For example, the asset manager 156 may not identify another computing node within the same geographical region as the second computing node 150 that has a copy of the required one or more digital files, the identified computing node (e.g., first computing node 110) may no more be actively connected to the blockchain infrastructure 130, the peer-to-peer connection between the first and second computing nodes may fail or time out, or the download of the copy of the digital files from the identified computing node (e.g., first computing node 110) may not be successful.

In certain alternative aspects, a copy of the blockchain ledger 140 may be stored in one or more centralized servers (e.g., one or more of the servers 180) and every computing node of the blockchain infrastructure 130 may not store a local copy of the blockchain ledger 140. The computing nodes that do not store a local copy of the blockchain ledger 140 may access a copy of the blockchain ledger 140 at a nearest server 180 storing a copy of the blockchain ledger 140.

Figure 2:
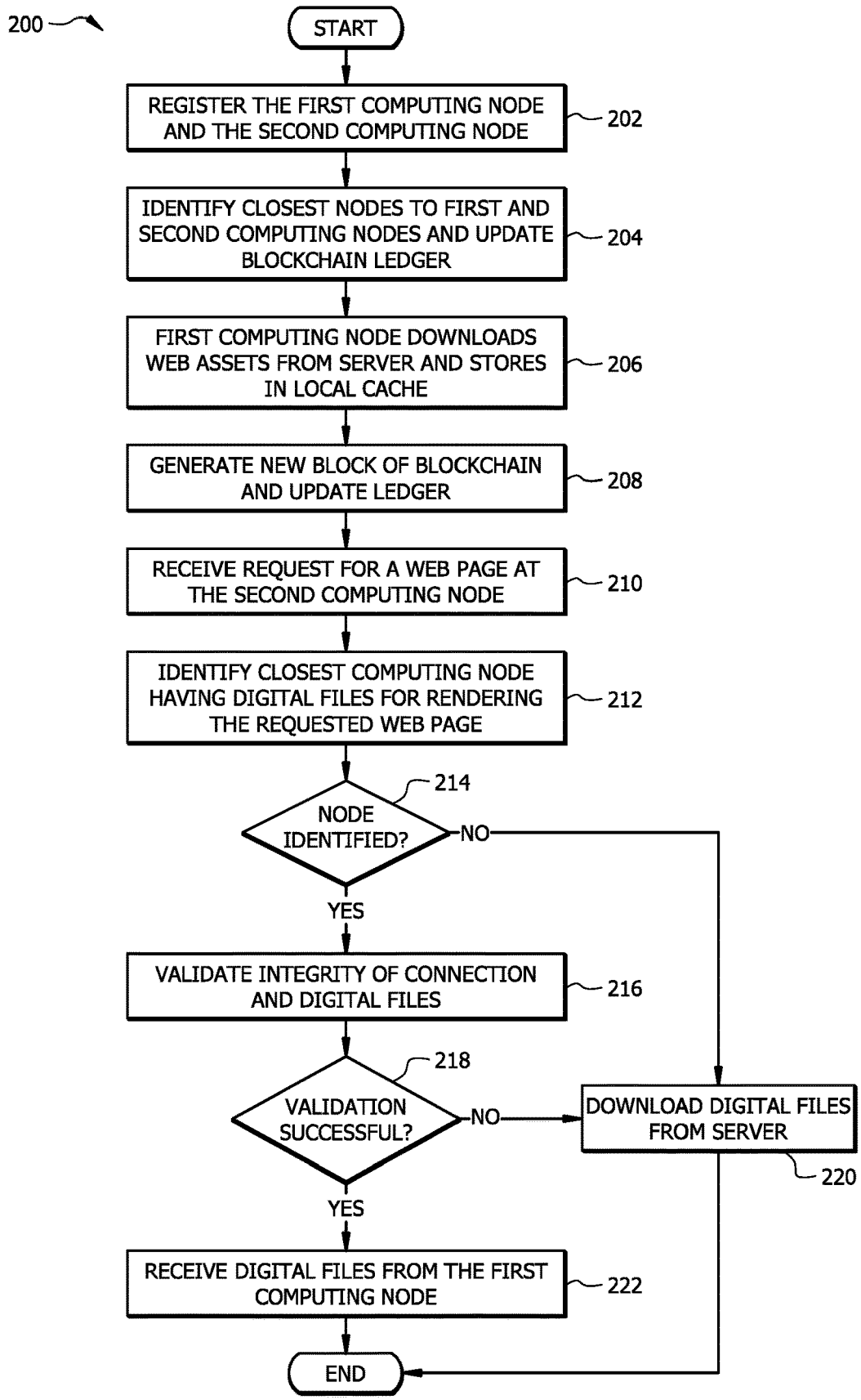
FIG. 2 illustrates a flowchart of an example method for exchanging data files between computing nodes of a blockchain infrastructure, in accordance with certain aspects of the present disclosure.

FIG. 2 illustrates a flowchart of an example method 200 for exchanging data files between computing nodes (e.g., computing node 110 and computing node 150) of a blockchain infrastructure (blockchain infrastructure 130), in accordance with certain aspects of the present disclosure.

At step 202, each of the first computing node 110 and the second computing node 150 is registered with the blockchain infrastructure 130. For example, each of the first computing node 110 and the second computing node 150 may register with the blockchain infrastructure 130 when they are powered on. Registration of each of the first computing node 110 and the second computing node 150 includes storing information relating to each of the computing nodes into the blockchain ledger 140. For example, when the first computing node 110 is powered on and connected to the blockchain infrastructure 130 as a new node, the blockchain manager 118 of the first computing node 110 receives a copy of the blockchain ledger 140 which it stores as ledger 124 in the memory device 112. The blockchain manager 118 further stores to the ledger 124 an IP address of the first computing node 110 and digital files stored in the cache 126. The blockchain manager 118 also sends out this information to other nodes of the blockchain infrastructure 130. For example, the blockchain manager 158 of the second computing node 150 receives and stores the same information in the ledger 164. In one aspect, the blockchain manager 118 generates a new block of the blockchain 132 upon addition of the first computing node 110 to the blockchain infrastructure 130. The new block records the new transaction of the first computing node 110 connecting to the blockchain infrastructure 130. The new block may be added to the blockchain 132 as described above.

At step 204, one or more geographically closest computing nodes are identified for each of the first computing node 110 and the second computing node 150, and the blockchain ledger 140 is updated with information relating to the identified closest computing nodes for each of the first and second computing nodes 110 and 150. For example, each of the geo-analyzers 120 and 160 is configured to detect one or more computing nodes of the blockchain infrastructure 130 that are geographically closest to the first computing node 110 and the second computing node 150 respectively. In an aspect, a computing node is determined as geographically closest to another computing node if the computing node is in the same geographical region as the other computing node. Each geo-analyzer (120 and 160) is configured to detect an IP address of the respective computing node (110 and 150) and determine a geographical region within which the computing node is located. Once, a geographical region of the computing node is identified, the geo-analyzer identifies other computing nodes that are in the same geographical region and designates the identified other computing nodes as closest computing nodes. For example, the geo-analyzer 120 may detect the IP address of the first computing node 110 and may determine a geographical region within which the first computing node 110 is located. The geo-analyzer 120 may upload the determined geographical region information of the first computing node 110 to the ledger 124 and also send out the information to other computing nodes for storing in their respective copies of the blockchain ledger 140. Once, the geographical region of the first computing node 110 is identified, the geo-analyzer 120 identifies other computing nodes that are in the same geographical region and designates the identified other computing nodes as closest computing nodes of the first computing node 110. The geo-analyzer 120 may upload the information relating to the closest computing nodes of the first computing node 110 to the ledger 124 and also send out the information to other computing nodes for storing in their respective copies of the blockchain ledger 140.

At step 206, the first computing node 110 downloads from a server 180 web assets required for rendering a web page at the first computing node 110 and stores the downloaded web assets in a local cache 126. For example, when a user operating the first computing node 110 requests a web page from a website, the web browser 114 retrieves the necessary web assets from a web server 180 and renders the web page based on the retrieved web assets for display on a display screen of the first computing node 110. Examples of web assets that are needed to render a web page include Java Script (JS) files, Cascading Style Sheet (CSS) files, images and the like.

At step 208, a new block is generated for the blockchain 132 to record the download transaction from the web server 180 and the blockchain ledger is updated accordingly to add the new block to the blockchain 132. For example, the downloading of the digital files by the first computing node 110 for rendering the web page triggers the blockchain manager 118 to generate a new block of the blockchain 132 in order to record the downloading as a new transaction. The blockchain manager 118 generates a unique hash for the new block and adds the generated hash to the new block. Additionally, the blockchain manager 118 adds a hash of the previous block and data relating to the new transaction to the new block. The data relating to the new transaction as added to the new block may include identities (e.g., IP addresses) of the first computing node 110 and the web server 180 used to download the digital files and information identifying the downloaded digital files. The blockchain manager 118 may also add a timestamp of the download transaction to the new block that identifies a time at which the download transaction took place. Once the new block is verified by other computing nodes of the blockchain infrastructure 130, the blockchain manager 118 adds the new block to the blockchain 132 and updates the copy of blockchain 132 stored in the ledger 124 to reflect the new block. Additionally, each other computing node of the blockchain infrastructure 130 updates its copy of the blockchain 132 locally stored in their respective memory devices. For example, the blockchain manager 158 updates the copy of the blockchain 132 persisted in the ledger 164 of the second computing node 150 to add the new block.

At step 210, the second computing node 150 receives a request for a web page. For example, a user of the second computing node 150 may request for the web page using the web browser 154, for example, by selecting a web link on another web page displayed by the web browser 154 on a display output. Alternatively, the user may request for the web page by entering a web address in an address field of the web browser 154.

At step 212, the second computing node 150 attempts to identify a geographically closest computing node that has a most recent copy of one or more digital files required to render the requested web page. The one or more digital files may include one or more web assets needed to render the requested web page. Examples of web assets that may be needed to render the web page include Java Script (JS) files, Cascading Style Sheet (CSS) files, images and the like. A computing node may be determined as geographically closest to the second computing node 150 when the computing node is within the same geographical region as the second computing node 150.

Upon receiving the request for the web page at the second computing node 150, the asset manager 156 may call the ledger 164 to obtain information relating to a geographically closest computing node that has a copy of the one or more digital files needed to render the requested web page. As described above, the ledger 164 may store information relating to the closest computing nodes for each computing node of the blockchain infrastructure 130, and further store information relating to the digital files locally stored at each computing node. For example, the ledger 164 may have information relating to multiple computing nodes that are in the same geographical region as the second computing node 150, and thus, are considered as geographically closest computing nodes to the second computing node 150. Further, more than one of these closest computing nodes may have a local copy of the one or more digital files required by the second computing node 150. In such a case, the asset manager 158 may select one of the closest computing nodes that has the most recent copy of the one or more digital files. In an aspect, the asset manager 158 may identify a most recent copy of the one or more digital files by comparing the timestamps of the blocks that recorded the downloading/receiving the digital files at each of the closest computing nodes. As described above, a new block is created and added to the blockchain 132 each time a computing node receives a digital file and a timestamp of the transaction is added the new block. The asset manager 158 may identify the closest computing node having the most recent copy of the digital file by identifying a closest computing node that generated a block for the download of the digital file with the most recent time stamp.

At step 214, the second computing node checks whether a geographically closest node was successfully identified that has a copy of the required one or more digital files. If the asset manager 156 of the second computing node 150 is unable to identify a geographically closest node that has a copy of the required one or more digital files, the method 200 proceeds to step 220 where the one or more digital files are downloaded from a web server as a fallback option.

Alternatively, if the asset manager 156 successfully identifies the first computing node 110 as a geographically closest node that has a copy of the required one or more digital files, the method 200 proceeds to step 216 where the integrity of connection with the first computing node 110 and the integrity of the one or more digital files to be received from the first computing node 110 is verified. For example, the validator 162 of the second computing node 150 validates whether the first computing node 110 is actively connected to the blockchain infrastructure 130, validates whether a reliable peer-to-peer connection can be established between the first and second computing nodes, and further validates whether the hash obtained from the ledger 164 points to the correct digital files needed for rendering the requested web page.

At step 218, if the validation of step 216 was not successful, the method 200 proceeds to step 220 where the one or more digital files are downloaded from a web server 180 as a fallback option.

Alternatively, if the validation of step 216 is successful, the method 200 proceeds to step 222 where a connection is established between the first computing node 110 and the second computing node 150 and the second computing node 150 receives the one or more digital files from the first computing node. 110.

The asset manager 156 of the second computing node 150 obtains information from the ledger 164 relating to the first computing node 110 and information relating to the copy of the one or more digital files stored in the cache 126 of the first computing node. This information may include the IP address of the first computing node 110 and a hash of the block of the blockchain 132 that uniquely identifies the downloading of the one or more digital files by the first computing node 110. The asset manager 156 may establish a peer-to-peer connection between the second computing node 150 and the first computing node 110 based on the IP address of the first computing node 110. For example, the WebRTC protocol may be used to establish the peer-to-peer connection between the first computing node 110 and the second computing node 150. The asset manager 156 may request the first computing node 110 for the copy of the one or more digital files stored in the cache 126 by transmitting the unique hash obtained from the ledger 164 over the peer-to-peer connection. The asset manager 116 of the first computing node 110 may identify the copy of the one or more digital files stored in cache 126 based on the hash and transmit the copy to the second computing node 150 over the peer-to-peer connection. IPFS protocol may be used for exchanging data between the first computing node 110 and the second computing node 150 over the WebRTC based peer-to-peer connection. For example, the second computing node 150 may transmit the unique hash identifying the copy of the one or more digital files stored in the cache 126 using the IPFS protocol. Further, the second computing node 150 may receive the copy of the one or more digital files from the first computing node using the IPFS protocol. Upon receiving the copy of the one or more digital files from the first computing node 110, the web browser 154 of the second computing node 150 may render the requested web page based on the web assets included in the one or more digital files.

Figure 3:
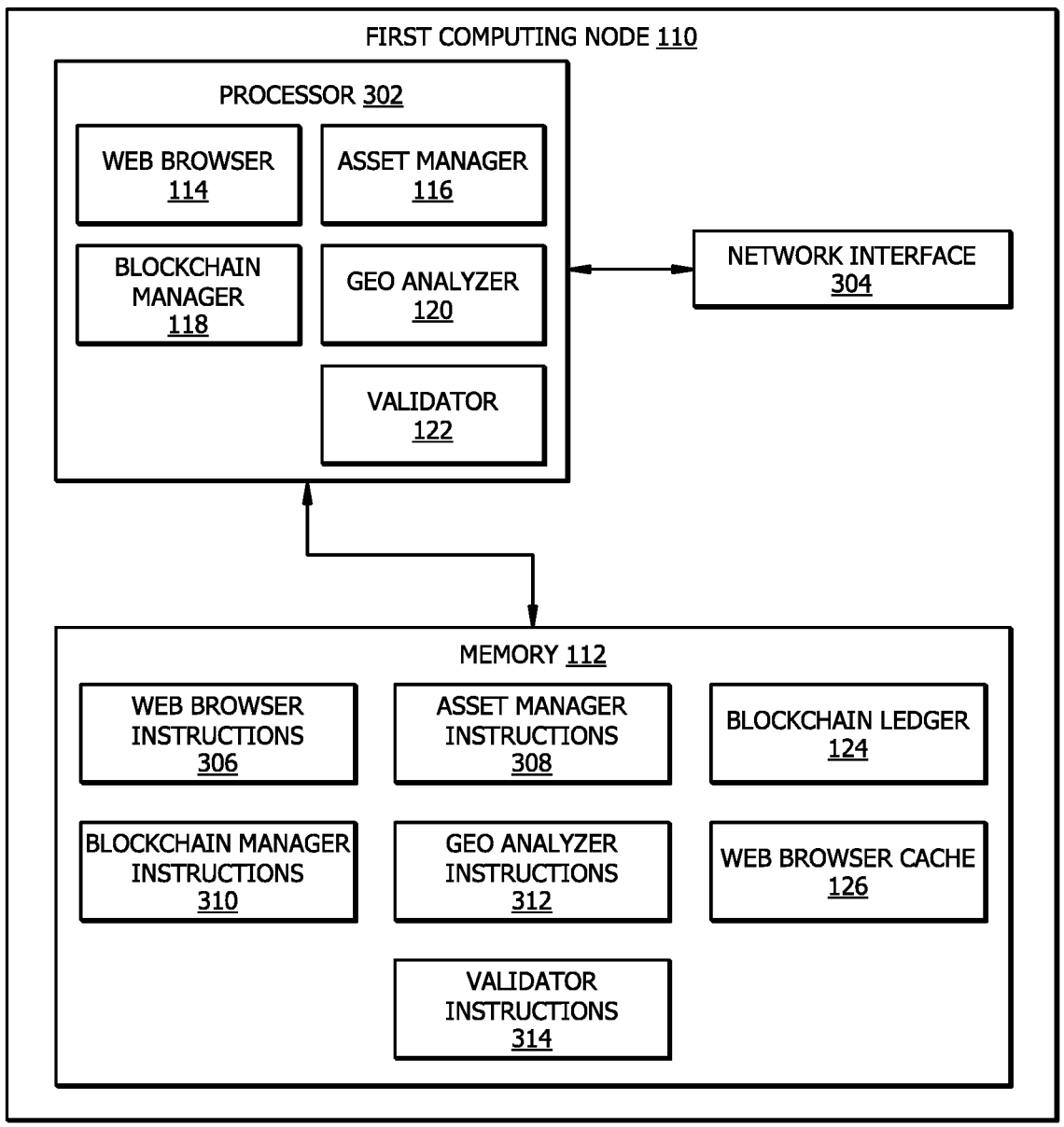
FIG. 3 illustrates an example schematic diagram of a computing node of a blockchain infrastructure, in accordance with one or more aspects of the present disclosure.

FIG. 3 illustrates an example schematic diagram 300 of a computing node (e.g., first computing node 110 and/or second computing node 150) of a blockchain infrastructure (e.g., blockchain infrastructure 130), in accordance with one or more aspects of the present disclosure. The first computing node 110 comprises a processor 302, a memory 112, and a network interface 304. The first computing node 110 may be configured as shown in FIG. 3 or in any other suitable configuration.

The processor 302 comprises one or more processors operably coupled to the memory 112. The processor 302 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 302 may be a programmable logic device, a microcontroller, a microprocessor, or any suitable combination of the preceding. The processor 302 is communicatively coupled to and in signal communication with the memory 112. The one or more processors are configured to process data and may be implemented in hardware or software. For example, the processor 302 may be 8-bit, 16-bit, 32-bit, 64-bit or of any other suitable architecture. The processor 302 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions (web browser instructions 306, asset manager instructions 308, blockchain manager instructions 310, geo-analyzer instructions 312 and validator instructions 314) to implement the web browser 114, asset manager 116, blockchain manager 118, geo-analyzer 120 and validator 122. In this way, processor 302 may be a special-purpose computer designed to implement the functions disclosed herein. In one or more aspects, each of the web browser 114, asset manager 116, blockchain manager 118, geo-analyzer 120 and validator 122 are implemented using logic units, FPGAs, ASICs, DSPs, or any other suitable hardware. The web browser 114, asset manager 116, blockchain manager 118, geo-analyzer 120 and validator 122 are configured to operate as described with reference to FIGS. 1 and 2. For example, the web browser 114, asset manager 116, blockchain manager 118, geo-analyzer 120 and validator 122 may be configured to perform at least a portion of the flowchart 200 as described in FIG. 2, respectively.

The memory 112 comprises one or more disks, tape drives, or solid-state drives, and may be used as an over-flow data storage device, to store programs when such programs are selected for execution, and to store instructions and data that are read during program execution. The memory 112 may be volatile or non-volatile and may comprise a read-only memory (ROM), random-access memory (RAM), ternary content-addressable memory (TCAM), dynamic random-access memory (DRAM), and static random-access memory (SRAM).

The memory 112 is operable to store the web browser instructions 306, asset manager instructions 308, blockchain manager instructions 310, geo-analyzer instructions 312, validator instructions 314, the blockchain ledger 124, the web browser cache 126 and/or any other data or instructions. Each of the web browser instructions 306, asset manager instructions 308, blockchain manager instructions 310, geo-analyzer instructions 312 and validator instructions 314 may include any suitable set of instructions, logic, rules, or code operable to execute the web browser 114, asset manager 116, blockchain manager 118, geo-analyzer 120 and validator 122 respectively.

The network interface 304 is configured to enable wired and/or wireless communications. The network interface 304 is configured to communicate data between the first computing node 110 and other devices (e.g. the second computing node 150), systems, or domains. For example, the network interface 304 may comprise a Wi-Fi interface, a LAN interface, a WAN interface, a modem, a switch, or a router. The processor 302 is configured to send and receive data using the network interface 304. The network interface 304 may be configured to use any suitable type of communication protocol as would be appreciated by one of ordinary skill in the art.

It may be noted that the construction of the second computing node 150 is similar to the construction of the first computing node 110 as shown in FIG. 3.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system comprising:
   a first computing node of a plurality of computing nodes of a blockchain infrastructure connected to a network, wherein each of the plurality of computing nodes stores a copy of a distributed ledger having at least one of:
      information related to a location of each of the plurality of computing nodes;
      information relating to one or more neighboring computing nodes of each of the plurality of computing nodes;
      information relating to one or more digital files stored locally at each of the plurality of computing nodes; and
      information relating to hash mappings of blocks of a blockchain associated with the blockchain infrastructure;
   wherein the first computing node comprises a first memory device that stores a first copy of the distributed ledger and at least one digital file downloaded by the first computing device; and
   a second computing node of the plurality of computing nodes comprising:
      a second memory device that stores a second copy of the distributed ledger; and
      a processor operably coupled to the second memory device, wherein the processor is configured to:
         obtain a request for the at least one digital file;
         detect an Internet Protocol (IP) address of the second computing node;
         determine, based on the IP address, a geographical region in which the second computing node is located;
         determine from the distributed ledger, a plurality of computing nodes including the first computing node that are in a same geographical region as the second computing node and locally store a copy of the at least one digital file, wherein the distributed ledger stores information relating to geographically closest computing nodes for each computing node of the blockchain infrastructure;
         compare timestamps of the blocks of the blockchain that recorded downloading of the at least one digital file at each of the determined plurality of computing nodes;
         determine, based on the comparing, that a block generated by the first computing node has a most recent time stamp among the timestamps of the blocks of the blockchain that recorded downloading of the at least one digital file at each of the determined plurality of computing nodes; and
         identify the first computing node as a geographically closest computing node to the second computing node that has a most recent copy of the at least one digital file based on the most recent time stamp;
         establish a peer-to-peer connection with the first computing node; and
         receive the most recent copy of the at least one digital file from the first computing node over the peer-to-peer connection.

2. The system of claim 1, wherein the processor is further configured to:
   store the copy of the at least one digital file in the second memory device;
   generate a new block of the block chain based on the copy of the at least one digital file received from the first computing node;
   generate a hash of the new block, wherein the hash uniquely identifies the new block; and
   store a copy of the hash in the distributed ledger.

3. The system of claim 1, wherein the processor is further configured to:
   identify one or more other computing nodes within the geographical region; and
   store the one or more other computing nodes in the distributed ledger as geographically closest computing nodes of the second computing node.

4. The system of claim 1, wherein the processor is further configured to obtain, from the distributed ledger, information comprising:
   the first computing node is a geographically closest computing node of the second computing node; and
   the first computing node has the copy of the at least one digital file.

5. The system of claim 1, wherein the processor is further configured to:
   validate at least one of:
      the peer-to-peer connection between the first computing node and the second computing node;
      the copy of the at least one digital file stored at the first computing node; or
      a hash of a block of the blockchain, wherein the block and the corresponding hash is generated at the first computing node based on the copy of the at least one digital file stored in the first memory device;
   detect that the validating is successful; and
   receive the copy of the at least one digital file in response to detecting that the validating is successful.

6. The system of claim 5, further comprising:
   at least one content delivery server connected to the network, wherein the at least one content delivery server is configured to store and provide digital content to a set of the plurality of computing nodes including the second computing node,
   wherein the processor is configured to:
      detect that the validating is unsuccessful; and
      in response, download the at least one digital file from the at least one content delivery server.

7. The system of claim 1, wherein the at least one digital file includes at least one web asset used in rendering a web page.

8. The system of claim 1, wherein:
   the peer-to-peer connection is established using Web Real Time Communication (WebRTC) protocol; and
   the copy of the at least one digital file is transferred from the first computing node to the second computing node using Interplanetary File System (IPFS) protocol,
   wherein the at least one processor is configured to:
      obtain from the distributed ledger a hash generated based on the copy of the at least one digital file stored at the first computing node, wherein the hash uniquely identifies the copy of the at least one digital file stored at the first computing node;
transmit the hash to the first computing node over the peer-to-peer connection using the IPFS protocol; and
in response, receive the copy of the at least one digital file from the first computing node over the peer-to-peer connection using the IPFS protocol.

9. A method for operating a first computing node of a blockchain infrastructure for obtaining at least one digital file from a second computing node of the blockchain infrastructure, the method comprising:
obtaining, at the first computing node, a request for the at least one digital file;
identifying, based on a distributed ledger, the second computing node as a geographically closest computing node to the first computing node that has a copy of the at least one digital file stored locally at the second computing node, wherein the first computing node and the second computing node are from a plurality of computing nodes of the blockchain infrastructure, wherein each of the plurality of computing nodes stores a copy of the distributed ledger having at least one of:
information related to a location of each of the plurality of computing nodes;
information relating to one or more neighboring computing nodes of each of the plurality of computing nodes;
information relating to one or more digital files stored locally at each of the plurality of computing nodes; and
information relating to hash mappings of blocks of a blockchain associated with the blockchain infrastructure;
wherein the identifying comprises:
detecting an Internet Protocol (IP) address of the first computing node;
determining, based on the IP address, a geographical region in which the first computing node is located;
determining from the distributed ledger, a plurality of computing nodes including the second computing node that are in a same geographical region as the first computing node and locally store a copy of the at least one digital file, wherein the distributed ledger stores information relating to geographically closest computing nodes for each computing node of the blockchain infrastructure;
comparing timestamps of the blocks of the blockchain that recorded downloading of the at least one digital file at each of the determined plurality of computing nodes;
determining, based on the comparing, that a block generated by the second computing node has a most recent time stamp among the timestamps of the blocks of the blockchain that recorded downloading of the at least one digital file at each of the determined plurality of computing nodes; and
identifying the second computing node as the geographically closest computing node to the first computing node that has a most recent copy of the at least one digital file based on the most recent time stamp;
in response to the identifying, establishing a peer-to-peer connection with the second computing node; and
receiving the most recent copy of the at least one digital file from the second computing node over the peer-to-peer connection.

10. The method of claim 9, further comprising:
storing the copy of the at least one digital file at the first computing node;
generate a new block of the block chain based on the copy of the at least one digital file received from the second computing node;
generate a hash of the new block, wherein the hash uniquely identifies the new block; and
storing a copy of the hash in the distributed ledger.

11. The method of claim 9, further comprising:
identifying one or more other computing nodes within the geographical region; and
storing the one or more other computing nodes in the distributed ledger as geographically closest computing nodes of the first computing node.

12. The method of claim 9, wherein first computing node obtains, from the distributed ledger, information comprising:
the second computing node is a geographically closest computing node of the first computing node; and
the second computing node has the copy of the at least one digital file.

13. The method of claim 9, further comprising:
validating at least one of:
the peer-to-peer connection between the first computing node and the second computing node;
the copy of the at least one digital file stored at the second computing node; or
a hash of a block of the blockchain, wherein the block and the corresponding hash is generated at the second computing node based on the copy of the at least one digital file stored locally at the second computing node;
detecting that the validating is successful; and
receiving the copy of the at least one digital file from the second computing node in response to detecting that the validating is successful.

14. The method of claim 13, further comprising:
detect that the validating is unsuccessful; and
in response, download the at least one digital file from a content delivery server, wherein the content delivery server is configured to store and provide digital content to a set of the plurality of computing nodes including the first computing node.

15. The method of claim 9, wherein the at least one digital file includes at least one web asset used in rendering a web page.

16. The method of claim 9, wherein:
the peer-to-peer connection is established using Web Real Time Communication (WebRTC) protocol; and
the copy of the at least one digital file is transferred from the second computing node to the first computing node using Interplanetary File System (IPFS) protocol,
further comprising:
obtaining from the distributed ledger a hash generated based on the copy of the at least one digital file stored at the second computing node, wherein the hash uniquely identifies the copy of the at least one digital file stored at the second computing node;
transmitting the hash to the second computing node over the peer-to-peer connection using the IPFS protocol; and
in response, receiving the copy of the at least one digital file from the second computing node over the peer-to-peer connection using the IPFS protocol.

17. A non-transitory computer-readable medium for storing instructions which when executed by a processor causes the processor to perform a method for operating a first computing node of a blockchain infrastructure for obtaining at least one digital file from a second computing node of the blockchain infrastructure, the method comprising:

obtaining, at the first computing node, a request for the at least one digital file;

identifying, based on a distributed ledger, the second computing node as a geographically closest computing node to the first computing node that has a copy of the at least one digital file stored locally at the second computing node, wherein the first computing node and the second computing node are from a plurality of computing nodes of the blockchain infrastructure, wherein each of the plurality of computing nodes stores a copy of the distributed ledger having at least one of:

information related to a location of each of the plurality of computing nodes;

information relating to one or more neighboring computing nodes of each of the plurality of computing nodes;

information relating to one or more digital files stored locally at each of the plurality of computing nodes; and information relating to hash mappings of blocks of a blockchain associated with the blockchain infrastructure;

wherein the identifying comprises:

detecting an Internet Protocol (IP) address of the first computing node;

determining, based on the IP address, a geographical region in which the first computing node is located;

determining from the distributed ledger, a plurality of computing nodes including the second computing node that are in a same geographical region as the first computing node and locally store a copy of the at least one digital file, wherein the distributed ledger stores information relating to geographically closest computing nodes for each computing node of the blockchain infrastructure;

comparing timestamps of the blocks of the blockchain that recorded downloading of the at least one digital file at each of the determined plurality of computing nodes;

determining, based on the comparing, that a block generated by the second computing node has a most recent time stamp among the timestamps of the blocks of the blockchain that recorded downloading of the at least one digital file at each of the determined plurality of computing nodes; and identifying the second computing node as the geographically closest computing node to the first computing node that has a most recent copy of the at least one digital file based on the most recent time stamp;

in response to the identifying, establishing a peer-to-peer connection with the second computing node; and receiving the most recent copy of the at least one digital file from the second computing node over the peer-to-peer connection.

18. The non-transitory computer-readable medium of claim 17, further comprising instructions for:

identifying one or more other computing nodes within the geographical region; and storing the one or more other computing nodes in the distributed ledger as geographically closest computing nodes of the first computing node.

19. The non-transitory computer-readable medium of claim 17, wherein first computing node obtains, from the distributed ledger, information comprising:

the second computing node is a geographically closest computing node of the first computing node; and the second computing node has the copy of the at least one digital file.

20. The non-transitory computer-readable medium of claim 17, further comprising instructions for:

validating at least one of:

the peer-to-peer connection between the first computing node and the second computing node;

the copy of the at least one digital file stored at the second computing node; or a hash of a block of the blockchain, wherein the block and the corresponding hash is generated at the second computing node based on the copy of the at least one digital file stored locally at the second computing node;

detecting that the validating is successful; and receiving the copy of the at least one digital file from the second computing node in response to detecting that the validating is successful.

* * * * *